July 3, 1934.	E. H. DOUGHTY	1,965,407
BEARING MOUNTING
Filed Aug. 13, 1931	3 Sheets-Sheet 1
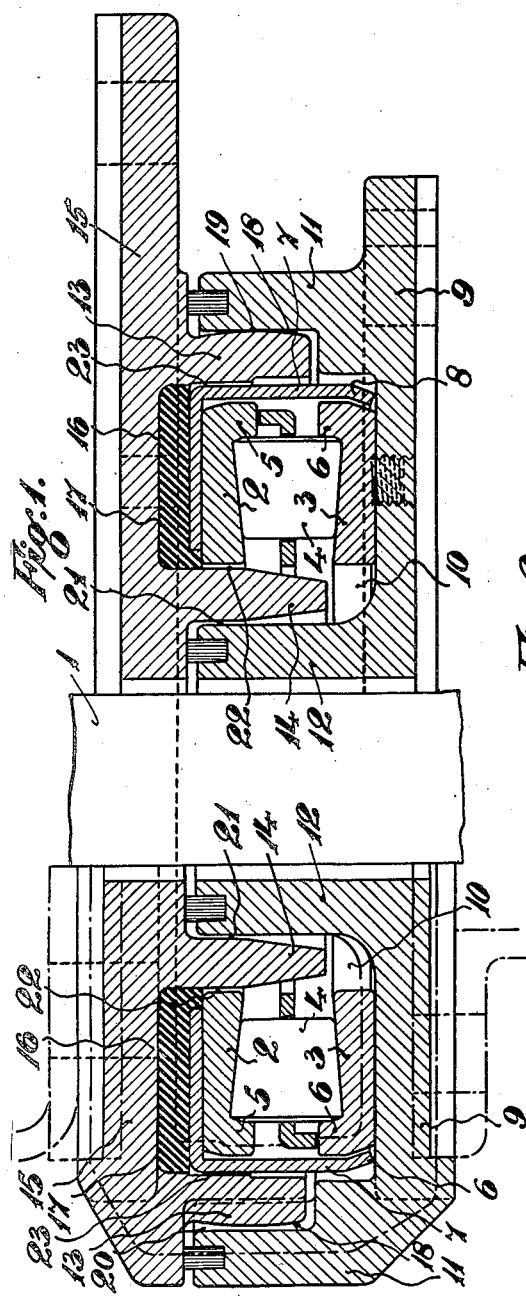
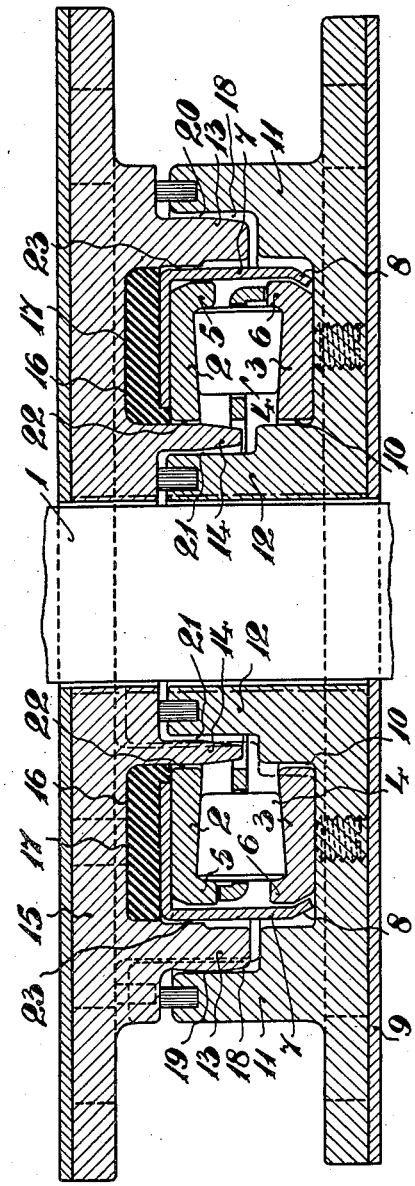
Inventor
E. H. Doughty
By
Attorneys July 3, 1934. E. H. DOUGHTY 1,965,407
BEARING MOUNTING
Filed Aug. 13, 1931 3 Sheets-Sheet 2
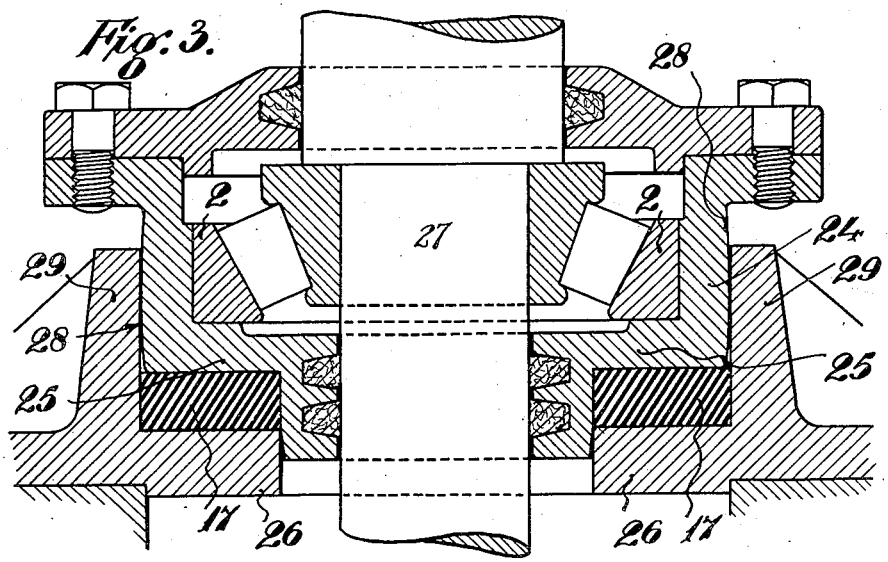
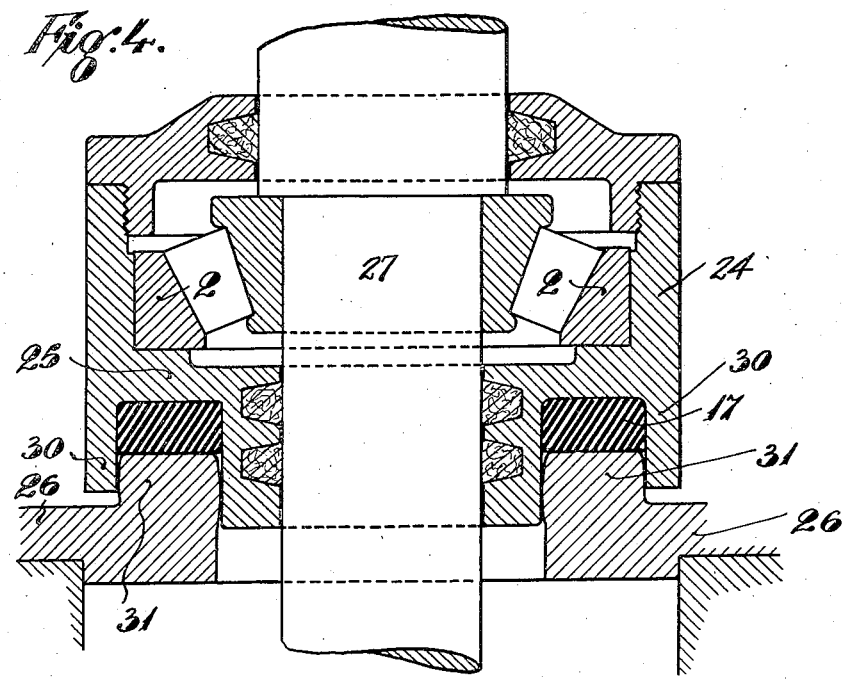
Inventor E. H. Doughty
By [signature]
Attorneys

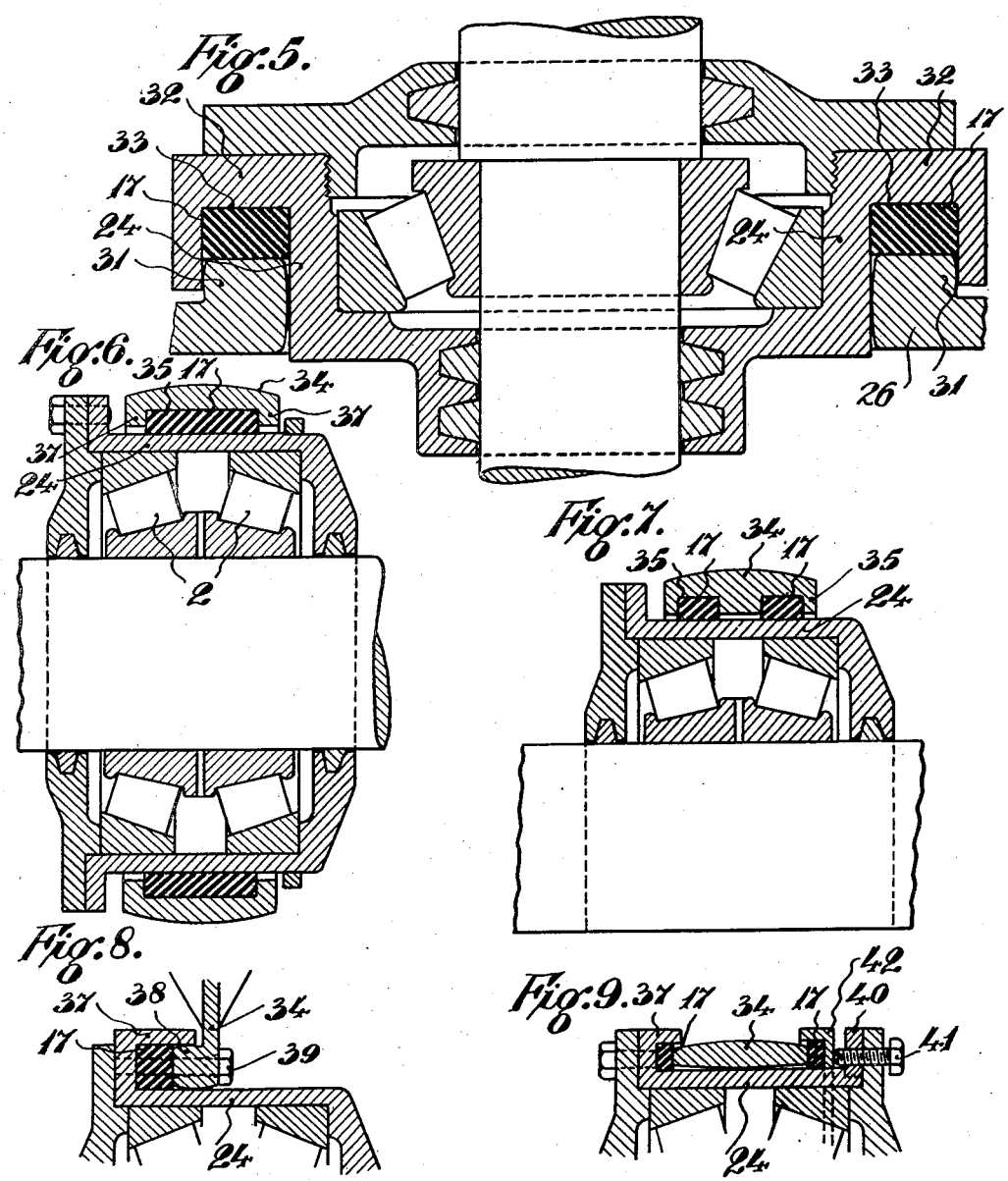

Patented July 3, 1934

1,965,407

UNITED STATES PATENT OFFICE 1,965,407

BEARING MOUNTING

Eldred Herbert Doughty, Aston, Birmingham, England, assignor to The Timken Roller Bearing Company, Canton, Ohio, a corporation of Ohio Application August 13, 1931, Serial No. 556,781
In Great Britain May 7, 1931

10 Claims. (Cl. 308—227)

This invention relates to roller, ball and other bearings such as shaft bearings, footstep pivot bearings or bearings for bogie mountings of railway and other vehicles.

The principal objects of the present invention are to provide simple but efficient means whereby the pressure due to the load is distributed over the bearing, to provide a shock absorber for relieving the bearing from sudden shocks, to allow of a tilting or rocking action of the shaft or other part that is supported in the same manner as would be permitted by a spherical bearing seat, and, in some applications of the invention, to facilitate the setting of the shaft and bearings in relation to the bearing support.

According to the invention, one or more cushioning rings or pads of rubber or similar resilient material are interposed between one or both of the bearing races or members and the part or parts upon which such races are mounted or supported, thereby permitting of a rising and falling or direct relative movement as well as a universal tilting or oscillating movement between the bearing support and the parts supported by the bearing, which movement is resiliently resisted by the rubber or like parts, which also relieve the bearing parts from shock. Conveniently, in the case of a vehicle bogie mounting, the said rubber or like cushioning ring or pad is located in an annular housing on a member carried by the vehicle or bogie frame, and preferably the walls of the housing on the part (either the vehicle or bogie frame) extend into a housing on the other part and engage the walls thereof, so that the engaging wall takes the tractive and/or braking forces, whether the bogie carries a driving motor or whether it is a trailing bogie or the driving motor or the like is on the vehicle frame. A similar arrangement may be adopted for a footstep pivot bearing. In the case of a shaft bearing a rubber or like ring would be interposed between a race or race housing and the part on which the same is mounted.

Figure 1 of the accompanying drawings is a vertical section showing the application of the invention to a motor bogie pivot mounting of a railway vehicle.

Figure 2 is a similar view showing the application of the invention to a trailer bogie pivot mounting.

Figure 3 is a vertical section of a footstep pivot bearing mounting in accordance with the invention.

Figure 4 represents in section a modified footstep bearing mounting.

Figure 5 shows another modified footstep bearing mounting.

Figure 6 represents a modification showing the one method of applying the invention to a horizontal shaft mounting.

Figures 7 to 9 show various modified forms of the invention as applied to horizontal shaft mountings.

Referring to Figures 1 and 2 which show the application of the invention in connection respectively with a motor and with a trailer bogie pivot mounting of a railway vehicle, the said application of the invention in both cases is essentially the same. Thus, in the said figures the vehicle frame or body is connected to the bogie by a central pin 1 about the axis of which the bogie can swivel, and the vehicle frame is supported upon the bogie by a horizontal annular bearing concentric with the pivot. This bearing is conveniently of the taper roller type comprising upper and lower races 2, 3, with radially-disposed taper rollers 4 between them having their axes horizontal. The smaller ends of the rollers are presented inwards and their larger outer ends cooperate with thrust shoulders 5, 6, on the respective races. The said two races 2, 3, are held together by an angle-sectioned ring 7 one flange of which has its edge 8 closed over a chamfered outer corner of the lower race 3. This lower race 3 rests upon a base plate 9 mounted upon the bogie and is located in the lower part of an annular housing 10 formed between upstanding flanges 11, 12, upon the top face of said base plate. One or both of these flanges are stepped or shouldered upon their inner faces (in Figure 1 only the outer flange 11 is shown stepped but in Figure 2 both flanges are stepped) and the larger upper portion of the housing receives depending annular register flanges 13, 14, upon the underside of a top plate 15 of the bearing mounting, carried by the vehicle frame or body. These depending flanges 13, 14, are separated by an annular housing 16 which receives the upper race 2 of the bearing, but this annular housing extends above the said upper race and the space thus provided is filled by a cushioning ring 17 of hard oil-resisting rubber which is thus interposed between the upper race 2 and the top plate 15 of the bearing mounting. This rubber ring 17 is initially of less width than that of the housing, but when in position and the load is supported upon it, the said ring is spread out and caused to flow laterally so as entirely to fill the space between the upper race and the top face of the housing.

The depending flange 13 forming the outside wall of the housing for the rubber ring, has its outer surface slightly crowned, as at 18, and, when the vehicle is in motion, engages the outer upstanding flange 11 on the base plate, at the driving side of the mounting, as shown at 19, to admit of the tractive and braking forces being transmitted from the bogie to the vehicle in the case of the motor-carrying bogie (Figure 1) or to admit of the transmission of the tractive force from the vehicle frame to the bogie, and, vice versa, the braking force from the bogie to the vehicle frame, in the case of a trailing bogie (Figure 2). Clearances 20, 21, are provided respectively between the adjacent outer register flanges 11, 13, and between the inner flanges 12, 14, all round except, when the vehicle is in motion, at the driving side of the outer flanges which are in contact at this point, namely, at 19. Slight clearances are also provided at 22, 23, namely, between the upper race 2 and the flange 14, and between the ring 7 and the flange 13 respectively. In operation, the rubber ring 17 acts as a cushioning device between the top plate 15 and the bearing. It thus relieves the bearing elements from shock and allows the top plate to rise and fall without the bearing elements separating. The said ring ensures proper distribution of the load over the bearings, even in the event of the top plate 15 tilting relatively to the base plate 9. By giving a limited universal movement, it allows this tilting action to take place in the same manner as is permitted by a spherical bearing seat.

In a modification, the rubber ring may be employed below the bottom race 3 of the bearing; or rings may be employed between both upper and lower races 2, 3, and the respective top and bottom plates 15, 9, of the bearing mounting.

Instead of a taper rolling bearing being used, rollers with spherical surfaces, or balls, may be employed in conjunction with suitable upper and lower races. Or plain bearing rings may be provided.

In the application of the invention to a vertical footstep pivot bearing as shown in Figure 3, the outer race 2 of a roller bearing is contained within a circular housing 24 stepped at 25 at its lower end, the part of smaller diameter engaging an aperture in the base 26 around the shaft 27, and the part of larger diameter being crowned exteriorly at 28 and engaged within a socket formed by an annular upstanding register flange 29 on the base, a ring of rubber 17 being interposed between the external shoulder 25 of the race housing 24 and the bottom of the base socket. The construction shown in Figure 4 is similar to that just described but the race housing 24 has a depending outside flange 30 at its lower end fitting over an upstanding flange 31 on the base 26, a ring of rubber 17 being interposed between the shoulder 25 of the housing and the top of the upstanding flange 31, crowned surfaces, as shown on part 31, being provided to allow of a rocking action. Or, as shown in Figure 5, the housing 24 could have, at its upper end, a lateral overhanging extension 32 formed upon its underside with an annular channel 33 receiving a ring of rubber 17 and also adapted to receive the upper end of an upstanding flange 31 on the base 26, so that the rubber is compressed between the said flange and the overhanging part 32 of the race housing, the engaging surfaces of the said housing and flange being crowned.

In the case of a roller, ball or other bearing for a horizontal shaft, as shown in Figure 6, the outer races 2, 2, of the roller bearing are surrounded by a sleeve housing 24 between which, and a fixed outer pedestal, bracket or support 34, a rubber or like ring 17 is interposed. The said ring, which can be divided to facilitate assembly, is seated in a circumferential locating groove 35 in the said support 34. In this arrangement the rubber ring or rings serve to take radial pressure and to distribute the same over the bearing, besides cushioning radial shocks and allowing for a tilting or oscillating motion of the shaft 36. With the latter object a limited clearance is provided between the race housing and the support, at 37. Figure 7 shows a similar construction but the support 34 is provided with two grooves 35, 35, fitted with rubber rings 17, 17, surrounding the housing 24. In the arrangement shown in Figure 8, the race housing 24 is provided at one end with a co-axial annular channel 37 presented towards the opposite ends. This channel contains a rubber ring or pad 17 and receives an annular flange 38 on one side of a hanger bracket or like support 34, bolts 39 being passed through the said flange and the bottom of the channel 37 so that the rubber is compressed, suitable crowned surfaces, as shown on part 38, being provided to allow of a rocking action. End thrust is also taken by the rubber in this arrangement.

In the construction shown in Figure 9, the race housing 24 has a co-axial annular channel 37 at one end, as in the last-described arrangement, and at the other end a flange 40 is provided carrying screws 41 which bear upon an angle or channel sectional metal ring 42 surrounding and mounted on the housing. Rubber rings or pads 17, 17, are placed in the annular channel 37 at the one end and in the angle or channel ring 42 at the other end, and the ring or supporting part 34 of the bracket or the like surrounds the housing between these rubber rings. By tightening up the screws 41 the edges of the said ring or supporting part 34 of the bracket are gripped by and/or embedded in the rubber rings. Crowned surfaces are provided on one or both parts 24, 34, such as shown on part 34, to allow of a rocking action. This arrangement facilitates the setting of the bearing in the bracket or support notwithstanding that the shaft is not in absolute alignment with the said bracket, as the bearing can first be mounted and adjusted on the shaft and then the housing fixed in the support by the screws.

Having fully described my invention, what I desire to claim and secure by Letters Patent is:—

1. A vehicle bogie pivot mounting comprising a member on the vehicle frame, a depending annular flange thereon forming the wall of a housing, a member on the bogie frame, an upstanding annular flange thereon forming the wall of a housing, the one flange engaging over and surrounding the other flange, and one of the flanges having a crowned surface engageable with the other flange bearing races located respectively within the said housings, anti-friction rolling elements between the said races, and a rubber cushioning member located within one of the said housings and interposed between the race therein and the inner end of the housing, allowing of a relative rocking movement between the vehicle frame and the bogie frame.

2. A vehicle bogie pivot mounting comprising a vehicle frame member, a bogie frame member, concentric annular flanges on the said frame members fitting one over another and forming annular housings and a wall of a flange on one member having a crowned surface adapted to engage an opposed wall of a flange on the other member, annular bearing races located respectively in the said housings, anti-friction rolling elements between the said races, and a rubber cushioning member located within one of the said housings and interposed between the race therein and the inner end of the housing.

3. A vehicle bogie pivot mounting comprising a vehicle frame member having two concentric depending annular flanges spaced apart by an annular housing, a bogie frame member having two concentric upstanding annular flanges spaced apart by an annular housing the flanges of one member engaging over and surrounding the flanges of the other member, bearing races located respectively within the said housings, anti-friction rolling elements between the said races, and a rubber cushioning ring located within one of the said housings between the race therein and the inner end of the housing, clearances being provided between adjacent parts of the mounting and the outer flange of one of the housings having a crowned surface engageable with the opposed wall of the outer flange of the other housing to admit of a relative rocking action between the vehicle frame member and the bogie frame member.

4. A footstep pivot bearing mounting comprising an inner race, an outer race, anti-friction rolling elements between said races, a housing containing the outer race, a base member having an upstanding annular guide part engaging the housing, and a resilient body interposed between the housing and the base part, said housing and guide part having contacting circumferential surfaces at least one of which is crowned in an axial direction, whereby the said housing is capable of a rocking movement relatively to the base part.

5. A bearing mounting comprising a plurality of co-axial associated members including two relatively rotatable bearing members, a resilient cushioning device interposed between opposed radial surfaces of two associated parts and adapted to yieldably resist an axial load, two of the associated members of the mounting situated on opposite sides of the cushioning device being interfittingly and telescopically engaged by contacting circumferential and co-axial surfaces at least one of which is crowned in an axial direction, said interfitting associated members being relatively movable in an axial direction to admit of compression of the cushioning device and being capable of a relative universal oscillating movement.

6. A bearing mounting comprising two relatively rotatable bearing members, a co-axial housing member containing one of the bearing members, and a co-axial member having an annular guide part interfittingly and telescopically engaging said housing member, said engaging members having circumferential contacting surfaces one of which is crowned in an axial direction, one of the members of the mounting having a co-axial annular recess, a resilient cushioning device wholly contained within said recess and confined radially therein, and another of the members of the mounting engaging said cushioning device to exert axial pressure thereon.

7. A bearing mounting comprising interfitting and telescopic annular guide members extending in the axial direction of the bearing, an anti-friction bearing device enclosed within one of said members, and a resilient cushioning member disposed between the guide members, said cushioning member being adapted to be compressed in the axial direction of the bearing and one of the guide members having a crowned surface engaging a surface of the other guide member to permit of relative oscillating movement between said guide members.

8. A bearing mounting comprising a member with an annular flange, a second member with an annular flange fitting in said first mentioned flange, a taper roller bearing seated in one of said members, and an annular cushion intermediate between said members, one of said flanges having its surface next to the other flange crowned endwise to permit relative rocking movement.

9. A bearing mounting comprising a single roller bearing disposed with its axis vertical and comprising tapered raceway members and tapered rollers interposed between them, a member constituting a seat for said bearing, a second member axially movable relatively to said first member, means independent of the bearing for resisting radial load and a yielding cushion intermediate between said movable members and arranged to permit relative movement thereof, said means comprising a circular portion of one member fitting in a circular portion of the other member and one of said circular portions being crowned endwise.

10. A bearing mounting comprising a single roller bearing disposed with its axis vertical and comprising tapered raceway members and tapered rollers interposed between them, the axes of said rollers being approximately horizontal, a lower member having concentric upstanding flanges between which said bearing is seated, an upper member axially movable relatively to said first member and having concentric flanges between and fitting against said first mentioned flanges respectively for resisting radial load and a yielding cushion intermediate between said bearing and the upper movable member to permit relative movement thereof, the contacting surfaces of the flanges of said upper member being crowned endwise to permit said member to rock on said lower member.

ELDRED HERBERT DOUGHTY.